Feb. 10, 1931.   P. V. MORGAN   1,791,681
DEVICE FOR REMOVING TIRE SHOES FROM DROP CENTER RIMS
Filed June 17, 1929
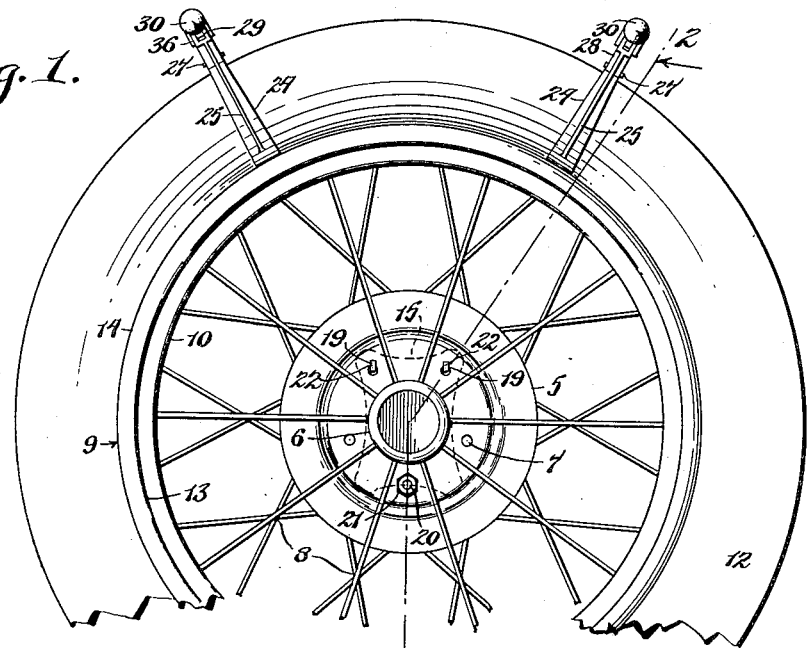
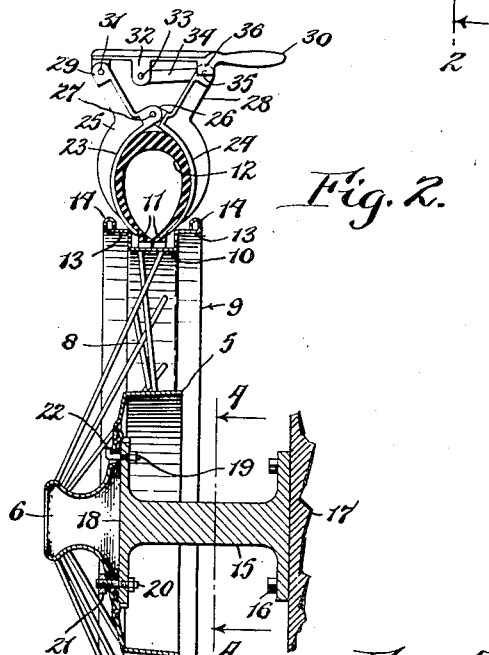
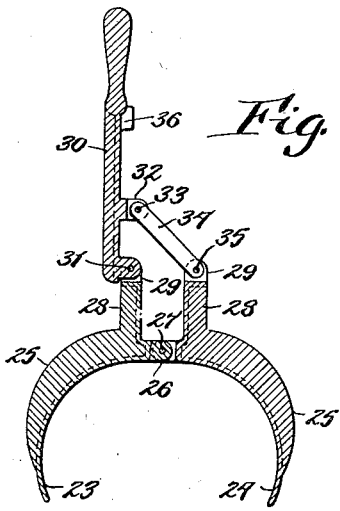
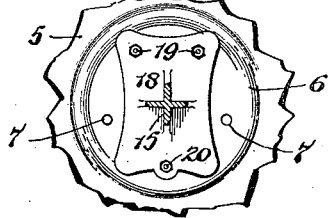
Inventor
Purley V. Morgan
By Poyger & Powers
Attorneys Patented Feb. 10, 1931

1,791,681

UNITED STATES PATENT OFFICE

PURLEY V. MORGAN, OF BUFFALO, NEW YORK

DEVICE FOR REMOVING TIRE SHOES FROM DROP-CENTER RIMS

Application filed June 17, 1929. Serial No. 371,639.

This invention relates to a device for use in the removal of the shoes of pneumatic automobile tires from the rims of the automobile wheel and more particularly to a device of this character which is adapted for use in connection with drop center rims.

With the use of drop center rims considerable difficulty has been encountered both in holding the wheel, of which the rim forms a part, and also in contracting the beads of the tire shoe to permit the tire to drop in the central channel of the drop center rim and permit of its removal from the rim. To avoid this difficulty the present invention proposes a simple and inexpensive device for drawing together the beads of the tire shoe so as to permit the tire shoe to be drawn in the central channel of the drop center rim and thereby lower the opposite end of the tire so that it can be swung laterally and removed from the rim.

Another object of this invention is to provide such a device in which the movement of the jaws which contract the beads is effected by a toggle linkage, this linkage being so designed as to pass beyond its dead center in the closing movement of the jaws and thereby hold the jaws in a locked, closed position, and the linkage is also so designed as to limit the closing movement of the jaws.

In the accompanying drawings:

Fig. 1 is a side elevation of a wire wheel having a drop center rim carrying a pneumatic tire, and showing a pair of devices embodying my invention applied to the tire, the devices being shown in their closed positions in which the beads of the tire are contracted.

Fig. 2 is a section taken on line 2—2, of Fig. 1 and showing the tire removing device in its closed position.

Fig. 3 is a longitudinal section through the tire removing device embodying my invention.

Fig. 4 is a section taken on line 4—4, Fig. 2.

Similar characters of references refer to like parts in the several figures of the drawings.

In this general organization this invention comprises a device for contracting the beads of pneumatic tire shoes, for use in connection with drop center rims, the device being composed of a pair of curved pivotally connected jaws which are adapted to embrace the tire shoe, the outer ends of the jaws being adapted to engage the outer sides of the beads of the tire, a toggle linkage for moving said jaws toward and from one another, a handle for manipulating said toggle linkage, said toggle linkage being arranged so as to pass beyond its dead center in the closing movement of the jaws and thereby hold the jaws locked in their closed position, and means for limiting the movement of said toggle linkage.

The device is shown in connection with a tire shoe applied to a demountable wire wheel having a drop center rim. This demountable wheel includes a central sheet metal drum 5 which is formed to provide a hub 6. This hub 6 is provided with a plurality of spaced holes 7 by means of which the hub is secured in place on the vehicle by means of bolts (not shown) in the usual and well known manner. To the drum 5 and hub 6 are welded a plurality of spokes 8, the outer ends of these spokes being welded to the inner side of the drop center rim 9. The drop center rim 9 is composed of a central channel portion 10 which is of sufficient size to receive the beads 11 of the tire shoe 12 when the beads are drawn together, laterally extending flanges 13 which project outwardly from the outer side walls of the central channel portion 10 and are adapted to support the beads 11 of the tire shoe when the tire is inflated and retaining beads 14 at the outer edges of the flanges 13 which retain the tire 12 in position on the flange 13 when it is inflated.

The removal of the tire 12 from such a rim is effected by first drawing together the beads 11 of the tire at one side thereof, as shown in Fig. 2. The tire is then shifted or moved relative to the rim so as to cause the contracted beads 11 to move into the central channel part 10 of the rim. This movement causes the opposite side of the tire to be moved away from the rim 9 sufficiently far so that this opposite end can be pulled laterally away from the rim and the tire completely disengaged from the rim.

Convenience in removing a tire in the manner described requires that means be provided for securely holding and supporting the demountable wheel while the tire is being removed. For this purpose a bracket 15 is provided which is adapted to be secured by screws or bolts 16 to a wall or other convenient support 17. At its outer end this bracket 15 is formed to provide a face plate 18. This face plate carries at its upper end a pair of hook bolts 19, the ends of which project forwardly from the face plate and are bent upwardly as best shown in Fig. 2. A third bolt 20 is provided at the lower end of the face plate 18. This bolt is formed to provide a threaded shank which projects outwardly from the face plate and on which a nut 21 is screwed.

In the use of this support the nut 21 is removed. The hub 6 of the demountable wheel is then brought against the face plate 18 and the hook bolts 19 are caught in the uppermost holes 7 of the hub, the normal use of these hubs being to secure the demountable wheel to the automobile. The hub 6 is caught by the hook bolts 19 in such manner that the hub is arranged against the face plate 18 and the outer face of the hub 6 is engaged by the upward extensions 22 of the hook bolts, as best shown in Fig. 2. The demountable wheel is then swung inwardly so as to cause the lowermost bolt 20 to engage in the lowermost hole 7 of the demountable wheel and the nut 21 is then applied so as to securely hold the wheel in position. It is apparent by this means that the hub 6 of the demountable wheel is securely held against movement and can only be removed from the support by removal of the nut 21 and by disengaging the hub 6 from the bolts 19 and 20 by the reverse of the method just described in securing the demountable wheel in position.

To contract the beads of the tire shoe a pair of devices forming the subject of the present invention are provided, these devices being constructed as follows:

The numerals 23, 24 represent a pair of curved jaws which are suitably reinforced by webs 25 and at their inner ends are formed to provide ears 26 which ears are connected by a pivot pin 27. The outer end of each of these jaws is adapted to engage the outer side of the bead 11 of the tire and the curvature of the jaws 23, 24 is such that these jaws are adapted to embrace the tire shoe as best illustrated in Fig. 2. At the inner end of each of these jaws a lateral extension 28 is provided, each of which is formed at its outer end to provide a pair of ears 29. To one of these extensions 28 a handle 30 is pivotally secured by means of a pivot pin 31. The outer end of this handle is formed to provide a grip and intermediate its ends this handle is formed to provide a pair of ears 32. The ears 32 are connected by a pivot pin 33 with a toggle link 34, the other end of this toggle link being connected by a pivot pin 35 with the ears 29 of the other extension 28. It is therefore apparent that when the handle is swung about its pivot pin 31 that the toggle link 34 will be moved to open and close the curved jaws 25 and thereby contract the tire beads 11 of the tire shoe to which the device is applied. In order to lock the device in its closed position the pivot pin 33 passes beyond the dead center of the pivot pins 31 and 35, as best shown in Fig. 2. By this means the jaws are locked in their closed position and can be released only by lifting the handle 30. In order to limit the closing movement of the jaws 23, 24 and thereby prevent injury to the tire beads by reason of too great a pressure being applied in contracting the same the handle 30 is formed to provide a seat 36, which, when the jaws are moved toward each other engages the outer end of the opposite extension 28 and prevents the jaws 23, 24 from being drawn together further than is necessary to contract the beads 11 of the tire to the desired position.

As a whole this invention provides an extremely simple, inexpensive, durable and easily manipulated device for drawing beads of pneumatic tire shoes together in applying the shoe to or removing the same from a drop center rim. It will also not get out of order under constant use and can be quickly and conveniently applied to the tire shoe and when applied and closed is locked so as to hold the beads of the tire shoe in a contracted condition until the device is manually released from the tire shoe. It is also so limited in its action as to prevent injury to the tire.

I claim as my invention:

A device for contracting the beads of pneumatic tire shoes comprising a pair of jaws adapted to embrace the tire shoe and having their outer ends formed to engage the outer sides of said shoe adjacent the beads thereof, means pivotally connecting the inner ends of said jaws, an integral extension projecting laterally outward from the inner end of each of said jaws, and each extension being arranged between the pivoted connection and the outer end of the corresponding jaw, a handle pivotally connected at its inner end to one of said extensions and having a laterally projecting ear intermediate its ends, and a link pivotally connecting said ear and the other extension whereby upon manipulation of said handle said jaws are moved toward and from one another, the said handle and link connection being adapted to pass beyond its dead center in the closing movement of said jaws thereby to hold said jaws in a locked closed position and said handle being adapted to engage the end of the opposite extension in the closing movement of said jaws and thereby limit the closing movement of said jaws.

In testimony whereof I hereby affix my signature.

PURLEY V. MORGAN.